(12) United States Patent
Kim et al.

(10) Patent No.: US 9,177,729 B2
(45) Date of Patent: Nov. 3, 2015

(54) SEPARATOR AND METHOD FOR MANUFACTURING SEPARATOR

(75) Inventors: Ick-soo Kim, Ueda (JP); Byoung-Suhk Kim, Ueda (JP); Kei Watanabe, Ueda (JP); Naotaka Kimura, Ueda (JP); Kyu-oh Kim, Ueda (JP); Jae-hwan Lee, Gumi-si (KR)

(73) Assignees: TOPTEC COMPANY LIMITED, Gumi-Si (KR); SHINSHU UNIVERSITY, Matsumoto-Shi (JP)

( * ) Notice: Subject to any disclaimer, the term of this patent is extended or adjusted under 35 U.S.C. 154(b) by 141 days.

(21) Appl. No.: 13/977,711

(22) PCT Filed: Feb. 6, 2012

(86) PCT No.: PCT/KR2012/000853
§ 371 (c)(1),
(2), (4) Date: Jun. 29, 2013

(87) PCT Pub. No.: WO2012/128474
PCT Pub. Date: Sep. 27, 2012

(65) Prior Publication Data
US 2014/0004405 A1    Jan. 2, 2014

(30) Foreign Application Priority Data

Mar. 20, 2011  (JP) .................................. 2011-061841
Nov. 29, 2011  (KR) ........................ 10-2011-0125760

(51) Int. Cl.
*H01G 9/02*  (2006.01)
*H01M 2/14*  (2006.01)
*H01M 2/16*  (2006.01)

(52) U.S. Cl.
CPC ................. *H01G 9/02* (2013.01); *H01M 2/145* (2013.01); *H01M 2/162* (2013.01); *H01M 2/1686* (2013.01)

(58) Field of Classification Search
CPC ... H01M 2/1686; H01M 2/145; H01M 2/162; H01G 9/02
USPC .......................................................... 429/144
See application file for complete search history.

(56) References Cited

U.S. PATENT DOCUMENTS 8,592,074 B2 * 11/2013 Liao ............................... 429/144
2004/0058249 A1 * 3/2004 Cai et al. ........................ 429/248
(Continued)

FOREIGN PATENT DOCUMENTS

| JP | 10-021894 A | 1/1998 |
|---|---|---|
| JP | 2007-048533 A | 2/2007 |

(Continued)

OTHER PUBLICATIONS

International Search Report of PCT/KR2012/000853.

*Primary Examiner* — Stewart Fraser
(74) *Attorney, Agent, or Firm* — Maxon IP, LLC.; Justin H. Kim

(57) ABSTRACT

The present invention provides a separator and a method for manufacturing the separator. The separator includes a first nanofiber layer (20) which has a lattice shape when viewed from a plan view, a second nanofiber layer (30) which is provided on a first surface of the first nanofiber layer (20) and is thinner than the first nanofiber layer, and a third nanofiber layer (40) which is provided on a second surface of the first nanofiber layer and is thinner than the first nanofiber layer. The thickness of the first nanofiber layer ranges from 7 μm to 30 μm. The thickness of each of the second and third nanofiber layers ranges from 1 μm to 5 μm. The present invention can provide a separator which has high insulation, high dendrite resistance, high ion conductivity and high mechanical strength.

12 Claims, 7 Drawing Sheets

(56) References Cited

U.S. PATENT DOCUMENTS

| | | | |
|---|---|---|---|
| 2008/0096103 A1* | 4/2008 | Naarmann | 429/122 |
| 2008/0118826 A1* | 5/2008 | Shimamura et al. | 429/129 |
| 2009/0011337 A1* | 1/2009 | Kajita et al. | 429/249 |
| 2010/0195270 A1* | 8/2010 | Hayakawa et al. | 361/502 |
| 2011/0217583 A1* | 9/2011 | Sugiyama et al. | 429/144 |
| 2011/0229750 A1* | 9/2011 | McLellan et al. | 429/144 |
| 2012/0148900 A1* | 6/2012 | Liao | 429/145 |

FOREIGN PATENT DOCUMENTS

| | | |
|---|---|---|
| JP | 2009-099836 A | 5/2009 |
| KR | 10-2006-0060188 A | 6/2006 |

* cited by examiner (a) First process (b) Second process (first)

(c) Second process (second)

(a)

(b)

(c)

(a) First process (b) Second process (first)

(c) Second process (second)

(a)

14

(b)

16

(c)

18

SEPARATOR AND METHOD FOR MANUFACTURING SEPARATOR

CROSS REFERENCE RELATED APPLICATION

This application claims foreign priority of Japanese Patent Application No. 2011-061841, filed on Mar. 20, 2011 and Korean Patent Application No. 10-2011-0125760, filed on Nov. 29, 2011, which are incorporated by reference in their entirety into this application.

TECHNICAL FIELD

The present invention relates to a separator and a method for manufacturing the separator.

BACKGROUND ART

Generally, separators with nanofiber layers are widely known (for example, refer to Patent document 1). Compared to separators with typical fiber layers, in the case of the separators with nanofiber layers, fibers are thin and pores are fine and uniform, so that insulation and dendrite resistance are superior. Therefore, it is possible that, with high insulation and high dendrite resistance, the thickness of the separator is reduced and the ion conductivity thereof is thus enhanced. Furthermore, the porosity of the separators with nanofiber layers is larger than that of the separators with typical fiber layers. Thus, the separators with nanofiber layers have high electrolyte sustainability, thereby further increasing the ion conductivity. As such, the separators with nanofiber layers can have high insulation, high dendrite resistance and high ion conductivity. Such a separator can be suitably used in a battery (including a primary battery and a secondary battery) or a condenser (referred to as a capacitor). Furthermore, in the present invention, the term "nanofiber" refers to a fiber, an average diameter of which ranges from several nanometers to several thousand nanometers.

DISCLOSURE

Technical Problem

However, in the conventional separator with a nanofiber layer, because nanofibers constituting the nanofiber layer comprise ultra-fine fibers, there is a problem of low mechanical strength. To overcome this problem, although increasing the thickness of the nanofiber layer may be considered as a way to enhance the mechanical strength, the increase in the thickness of the nanofiber layer induces a problem of a reduction in the ion conductivity.

Accordingly, the present invention has been made keeping in mind the above problems occurring in the prior art, and an object of the present invention is to provide a separator which has high insulation, high dendrite resistance, high ion conductivity and high mechanical strength. Another object of the present invention is to provide a method for manufacturing the separator.

Technical Solution

[1] In order to accomplish the above objects, the present invention provides a separator, including a first nanofiber layer which has a lattice shape when viewed from a plan view, a second nanofiber layer which is provided on a first surface of the first nanofiber layer and is thinner than the first nanofiber layer, and a third nanofiber layer which is provided on a second surface of the first nanofiber layer and is thinner than the first nanofiber layer.

According to the present invention, the separator includes the first nanofiber layer which has a lattice shape when viewed from a plan view, and the second and third nanofiber layers which are thinner than the first nanofiber layer. Hence, by virtue of the operation of the second nanofiber layer and the third nanofiber layer, the separator can have high insulation, high dendrite resistance and high ion conductivity.

Furthermore, because the separator includes the first nanofiber layer which has a lattice shape when viewed from the plan view, and the second and third nanofiber layers which are thinner than the first nanofiber layer, it is possible that the mechanical strength of the separator is satisfactorily enhanced merely by increasing the thickness of the lattice-shaped first nanofiber layer. Here, even if the thickness of the first nanofiber layer is increased, because the first nanofiber layer has a lattice structure when viewed from the plan view, the flow of electrolyte can be satisfactorily maintained, thereby preventing the ion conductivity from being reduced.

As a result, the separator according to the present invention can have high insulation, high dendrite resistance, high ion conductivity and high mechanical strength.

[2] Preferably, the first nanofiber layer may have a thickness ranging from 7 μm to 30 μm.

The reason why it is preferable that the first nanofiber layer has a thickness ranging from 7 μm to 30 μm is as follows. If the thickness of the first nanofiber layer is 7 μm or less, the mechanical strength of the separator is reduced. If the thickness of the first nanofiber layer is 30 μm or more, the thickness of the separator may be excessively increased. In this light, it is more preferable that the thickness of the first nanofiber layer ranges from 10 μm to 30 2 μm.

[3] Preferably, each of the second nanofiber layer and the third nanofiber layer may have a thickness ranging from 1 μm to 5 μm.

The reason why it is preferable that each of the second and third nanofiber layers has a thickness ranging from 1 μm to 5 μm is as follows. If the thickness of each of the second and third nanofiber layers is 1 μm or less, the insulation and the dendrite resistance may be reduced. If the thickness of each of the second and third nanofiber layers is 5 μm or more, the ion conductivity may be reduced. In this light, it is more preferable that the thickness of each of the second and third nanofiber layers ranges from 2 μm to 4 μm.

[4] The first nanofiber layer may have a plurality of openings having a total area greater than a total area of a lattice when viewed from the plan view.

By virtue of the above construction, even if the first nanofiber layer is formed to be comparatively thick so as to increase the mechanical strength, the flow of electrolyte can be satisfactorily maintained, thereby preventing the ion conductivity from being reduced.

[5] Each of the openings may have an average area ranging from 10 μm$^2$ to 200 μm$^2$ when viewed from the plan view.

The reason why it is preferable that each opening has an average area ranging from 10 μm$^2$ to 200 μm$^2$ when viewed from the plan view is as follows. If each opening has an average area of 10 μm$^2$ or less when viewed from the plan view, the ion conductivity may be reduced. If each opening has an average area of 200 μm$^2$ or more when viewed from the plan view, the mechanical strength of the separator may be reduced. In this light, it is more preferable that each opening has an average area ranging from 20 μm$^2$ to 100 μm$^2$ when viewed from the plan view.

[6] A method for manufacturing a separator according to the present invention include: a first process of applying high voltage between a nozzle and a collector electrode, having a lattice shape when viewed from a plan view, the collector electrode being disposed on an insulating support, and discharging polymer solution from the nozzle, thus forming a first nanofiber layer, having a lattice shape when viewed from a plan view, on the collector electrode; and a second process of forming a second nanofiber layer on a first surface of the first nanofiber layer, the second nanofiber layer being thinner than the first nanofiber layer, and forming a third nanofiber layer on a second surface of the first nanofiber layer, the third nanofiber layer being thinner than the first nanofiber layer.

In accordance with the separator manufacturing method of the present invention, a separator that has high insulation, high dendrite resistance, high ion conductivity and high mechanical strength can be manufactured.

[7] In the first process, the forming of the first nanofiber layer may comprise forming a first nanofiber layer having a thickness ranging from 7 μm to 30 μm.

In this way, the present invention can manufacture a separator which has sufficient mechanical strength despite having an appropriate thickness.

[8] In the second process, the forming of the second nanofiber layer and the third nanofiber layer may comprise forming a second nanofiber layer and a third nanofiber layer, each of which has a thickness ranging from 1 μm to 5 μm.

In this way, a separator which has high insulation, high dendrite resistance and high ion conductivity can be manufactured.

[9] In the first process, the forming of the first nanofiber layer may comprise forming a first nanofiber layer having a plurality of openings having a total area greater than a total area of a lattice when viewed from the plan view.

In this way, even if the first nanofiber layer is formed to be comparatively thick so as to increase the mechanical strength, the flow of electrolyte can be satisfactorily maintained, thereby preventing the ion conductivity from being reduced.

[10] Each of the openings may have an average area ranging from $10\,\mu m^2$ to $200\,\mu m^2$ when viewed from the plan view.

In this way, even if the first nanofiber layer is formed to be comparatively thick so as to increase the mechanical strength, the flow of electrolyte can be satisfactorily maintained, thereby preventing the ion conductivity from being reduced.

[11] In the second process, the second nanofiber layer may be formed on the first surface of the first nanofiber layer by electrospinning, and the third nanofiber layer may be formed on the second surface of the first nanofiber layer by electrospinning.

Therefore, the present invention makes it possible to produce a high-quality separator in which high bonding strength among the first nanofiber layer, the second nanofiber layer and the third nanofiber layer can be ensured.

[12] Before the second process is conducted, a second nanofiber layer and a third nanofiber layer that are formed by electrospinning may be prepared to be respectively used as the second nanofiber layer and the third nanofiber layer, and during the second process, the second nanofiber layer may be attached to the first surface of the first nanofiber layer, and the third nanofiber layer may be attached to the second surface of the first nanofiber layer.

In this way, the present invention makes it possible to produce a separator with high productivity.

Advantageous Effects

The present invention provides a separator which has high insulation, high dendrite resistance, high ion conductivity and high mechanical strength. Furthermore, the present invention provides a method for manufacturing the separator.

BEST MODE

Hereinafter, embodiments of a separator and a method for manufacturing the separator according to the present invention will be described with reference to the attached drawings.

Embodiment 1

1. Separator

Figure 1:
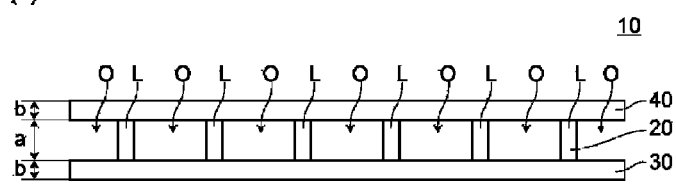
FIG. 1 illustrates a separator (10), according to a first embodiment of the present invention.
Figure 1:
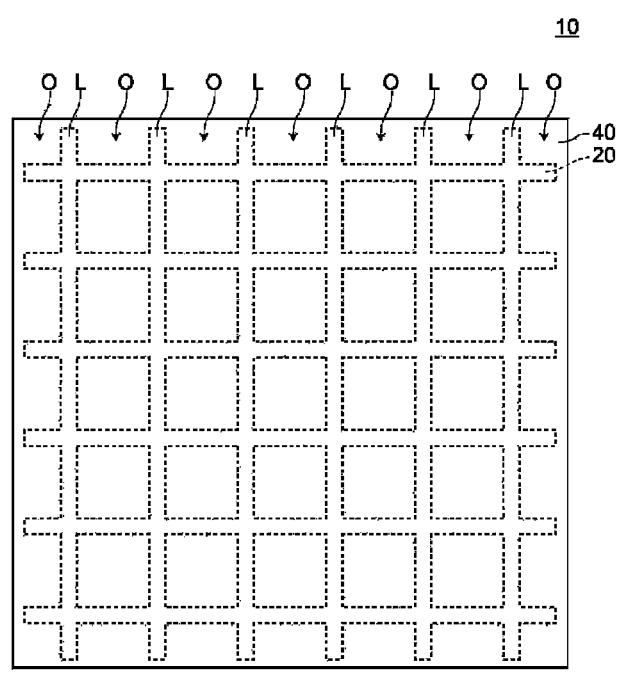

FIG. 1 illustrates a separator 10, according to a first embodiment of the present invention. FIG. 1a is a sectional view of the separator 10, and FIG. 1b is a plan view of the separator 10.

As shown in FIG. 1, the separator 10 according to the first embodiment of the present invention includes a first nanofiber layer 20 which has square openings and has a crisscross lattice structure when viewed from a plan view, a second nanofiber layer 30 which is disposed on one surface of the first nanofiber layer 20 and is thinner than the first nanofiber layer 20, and a third nanofiber layer 40 which is disposed on the other surface of the first nanofiber layer 20 and is thinner than the first nanofiber layer 20.

The thickness of the first nanofiber layer 20 ranges from 7 μm to 30 μm (for example, 15 μm). The thickness of each of the second and third nanofiber layers 30 and 40 ranges from 1 μm to 5 μm (for example, 3 μm).

When viewed from the plan view, the first nanofiber layer 20 has a plurality of openings O, a total area S2 of which is greater than a total area S1 of a lattice L. Each opening O has an average area ranging from $10\,\mu m^2$ to $200\,\mu m^2$ (for example, $50\,\mu m^2$). When viewed from the plan view, the thickness of the lattice L ranges from 1 μm to 10 μm (for example, 2 μm).

The first nanofiber layer 20 is formed of first nanofibers produced by electrospinning. Each first nanofiber has an average diameter ranging from 30 nm to 3000 nm (preferably, 800 nm). The first nanofiber layer 20 is made of polymer material (for example, polyolefin).

The second nanofiber layer 30 and the third nanofiber layer 40 are respectively formed by second nanofibers and third nanofibers which are produced by electrospinning. Each of the second and third nanofibers 30 and 40 has an average diameter ranging from 30 nm to 3000 nm (preferably, 300 nm). Also, each of the second and third nanofibers 30 and 40 is made of polymer material (for example, polyolefin).

2. Method for Manufacturing a Separator

Figure 2:
FIG. 2 illustrates a method for manufacturing the separator according to the first embodiment of the present invention.
Figure 2:
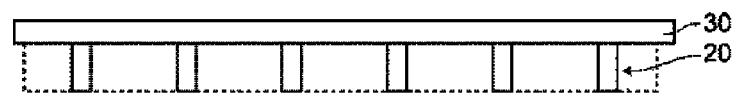
Figure 2:
Figure 3:
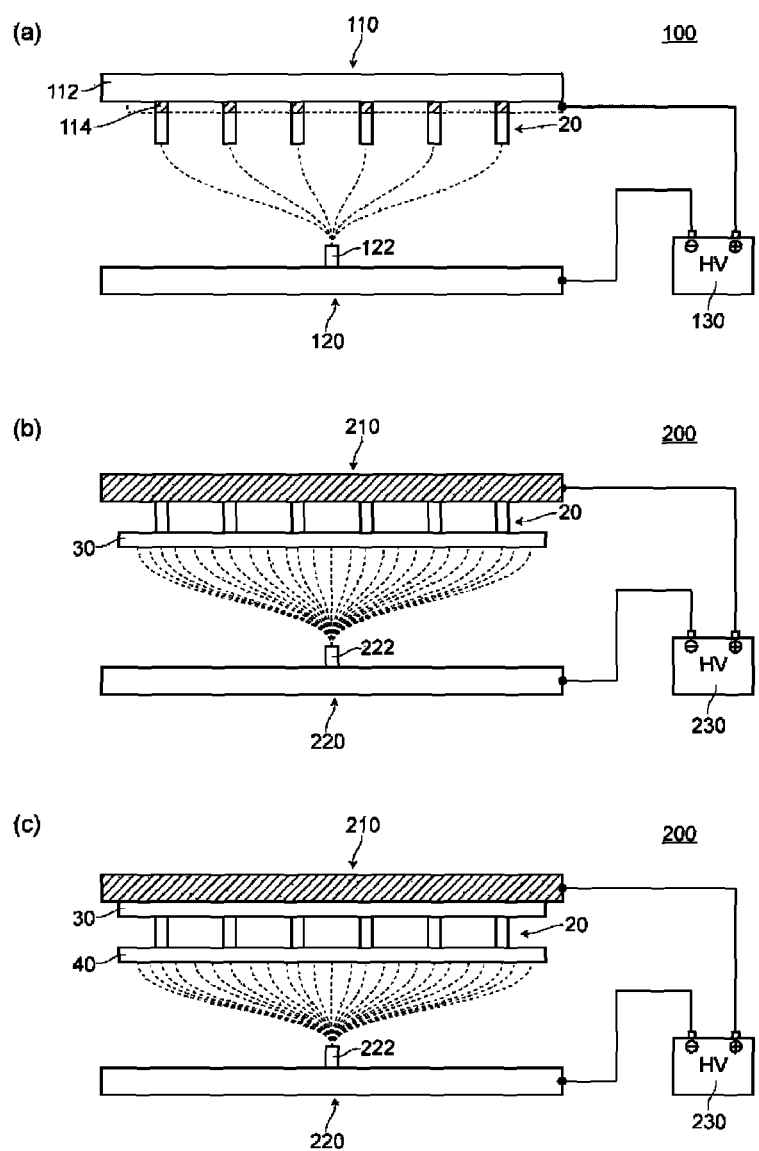
FIG. 3 illustrates a method for manufacturing the separator according to the first embodiment of the present invention.
Figure 4:
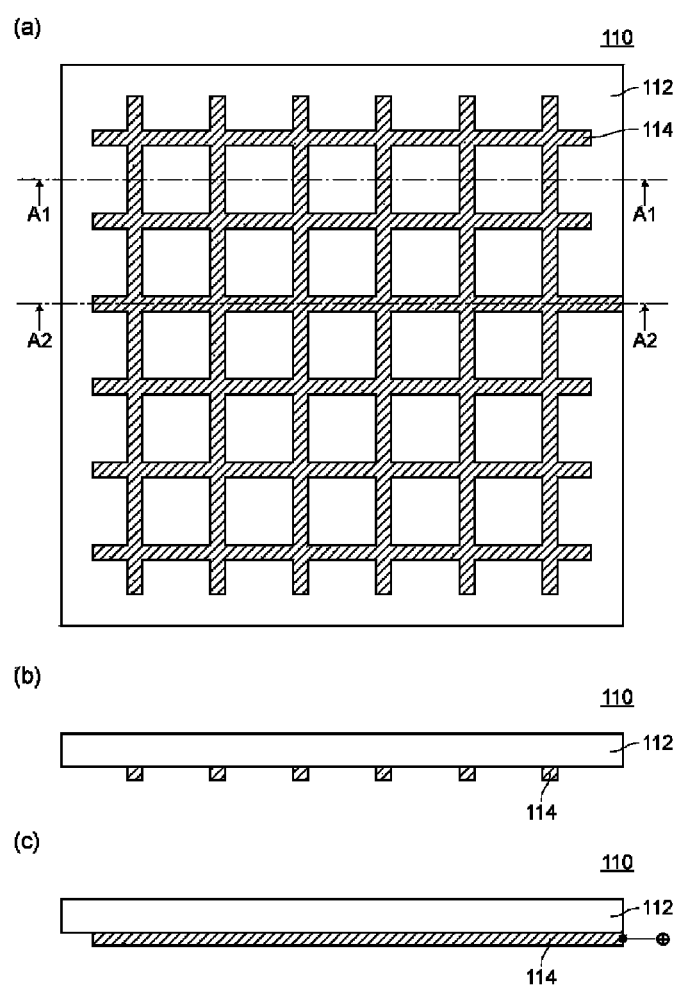
FIG. 4 illustrates the construction of a collector (110) used in the method for manufacturing the separator according to the first embodiment of the present invention.

FIGS. 2 and 3 are views illustrating a method for manufacturing the separator according to the first embodiment of the present invention. FIGS. 2a through 2c are sectional views showing a process of manufacturing the separator. FIGS. 3a through 3c are sectional views illustrating the operation of an apparatus while manufacturing the separator. FIG. 4 illustrates the construction of a collector 110 used in the separator manufacturing method according to the first embodiment. FIG. 4a is a bottom view of the collector 110, FIG. 4b is a sectional view taken along line A1-A1 of FIG. 4a, and FIG. 4c is a sectional view taken along line A2-A2 of FIG. 4a.

As shown in FIG. 2, the separator 10 according to the first embodiment can be manufactured by successively carrying out a first process (refer to FIG. 2a) of forming the first nanofiber layer 20 having a lattice shape, and a second process (refer to FIGS. 2b and 2c) of forming the second nanofiber layer 30, which is thinner than the first nanofiber layer 20, on one surface of the first nanofiber layer 20 and forming the third nanofiber layer 40, which is also thinner than the first nanofiber layer 20, on the other surface of the first nanofiber layer 20. Hereinafter, the processes will be explained in order.

(1) First Process

As shown in FIG. 3a, the first process is conducted using an electrospinning apparatus 100. The electrospinning apparatus 100 includes a collector electrode 114, a nozzle 122 which is disposed facing the collector electrode 114, a power supply 130 which applies high voltage between the collector electrode 114 and the nozzle 122, and a raw material tank (not shown) which stores polymer solution which is supplied to the nozzle 122. As shown in FIG. 4, the collector electrode 114 comprises an electrode which has a lattice shape when viewed from the plan view and is disposed on a support 112 made of an insulation material. The support 112 and the collector electrode 114 form the collector 110.

The nozzle 122 is oriented upwards and is installed on a nozzle block 120. An anode of the power supply 130 is connected to the collector electrode 114, and a cathode of the power supply 130 is connected to the nozzle block 120.

During the first process, with high voltage applied between the collector electrode 114 and the nozzle 122, the nozzle 122 discharges polymer solution and forms the lattice-shaped first nanofiber layer 20 on the collector 110.

(2) Second Process

As shown in FIGS. 3b and 3c, the second process is conducted using an electrospinning apparatus 200. The electrospinning apparatus 200 is a typical electrospinning apparatus, and a collector 210 comprises a planar electrode.

In the second process, first, the first nanofiber layer 20 is installed on the collector 210 of the electrospinning apparatus 200. Thereafter, with high voltage applied between the collector 210 and the nozzle 222, the nozzle 222 discharges polymer solution, thus forming the second nanofiber layer 30 on one surface of the first nanofiber layer 20 (refer to FIG. 2b).

Subsequently, the layered substance including the first nanofiber layer 20 and the second nanofiber layer 30 is turned upside down and is installed on the collector 210 of the electrospinning apparatus 200. Thereafter, while high voltage is applied between the collector 210 and the nozzle 222, the nozzle 222 discharges polymer solution, thus forming the third nanofiber layer 40 on the other surface of the first nanofiber layer 20 (refer to FIG. 2c).

In this way, the separator 10 according to the first embodiment can be manufactured.

3. Effects of the First Embodiment (1) Effects of the Separator

The separator 10 according to the first embodiment includes the first nanofiber layer 20 which has a lattice shape when viewed from the plan view, and the second and third nanofiber layers 30 and 40 which are thinner than the first nanofiber layer 20. Therefore, by virtue of the operation of the second nanofiber layer 30 and the third nanofiber layer 40, the separator 10 can have high insulation, high dendrite resistance and high ion conductivity.

Furthermore, because the separator 10 according to the first embodiment includes the first nanofiber layer 20 which has a lattice shape when viewed from the plan view, and the second and third nanofiber layers 30 and 40 which are thinner than the first nanofiber layer 20, it is possible that the mechanical strength of the separator 10 is satisfactorily enhanced merely by increasing the thickness of the lattice-shaped first nanofiber layer 20. Here, even if the thickness of the first nanofiber layer 20 is increased, because the first nanofiber layer 20 has a lattice structure when viewed from the plan view, the flow of electrolyte can be satisfactorily maintained, thereby preventing the ion conductivity from being reduced.

As such, the separator 10 according to the first embodiment can have high insulation, high dendrite resistance, high ion conductivity and high mechanical strength.

Furthermore, since the thickness of the first nanofiber layer 20 ranges from 7 μm to 30 μm, the separator 10 according to the first embodiment has sufficient mechanical strength despite having an appropriate thickness.

Moreover, in the separator 10 according to the first embodiment, because the thickness of each of the second and the third nanofiber layers 30 and 40 ranges from 1 μm to 5 μm, high insulation, high dendrite resistance and high ion conductivity can be ensured.

In addition, the separator 10 according to the first embodiment is configured such that the first nanofiber layer 20 has the openings, the total area of which is greater than that of the lattice. Hence, the separator 10 can have high ion conductivity.

Furthermore, because the average area of each opening ranges from 10 μm$^2$ to 200 μm$^2$, the separator 10 according to the first embodiment can have high ion conductivity.

(2) Effect of the Method for Manufacturing the Separator

The separator manufacturing method according to the first embodiment includes the first process and the second process which are successively carried out. In accordance with the method of the present invention, the separator 10 according to the first embodiment that has high insulation, high dendrite resistance, high ion conductivity and high mechanical strength can be manufactured.

Furthermore, in the separator manufacturing method according to the first embodiment, during the second process, the second nanofiber layer 30 is formed on one surface of the first nanofiber layer 20 by electrospinning while the third nanofiber layer 40 is formed on the other surface of the first nanofiber layer 20 by electrospinning. Therefore, the method of the present invention makes it possible to produce a high-quality separator in which high bonding strength among the first nanofiber layer 20, the second nanofiber layer 30 and the third nanofiber layer 40 can be ensured.

Embodiment 2

Figure 5:
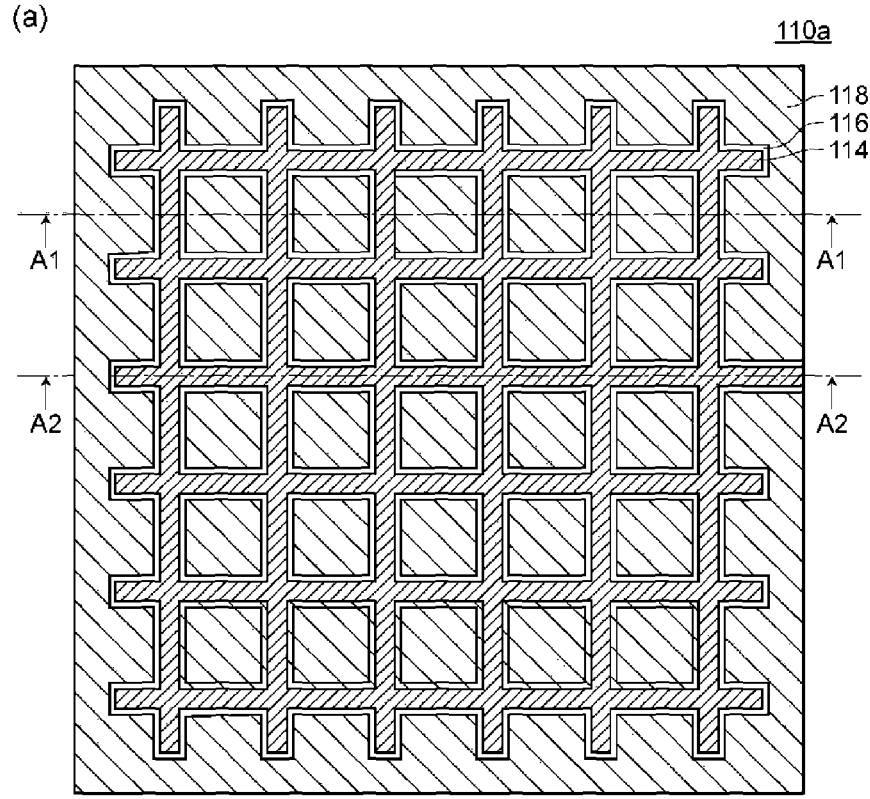
FIG. 5 illustrates the construction of a collector (110a) used in a method for manufacturing a separator, according to a second embodiment of the present invention.
Figure 5:
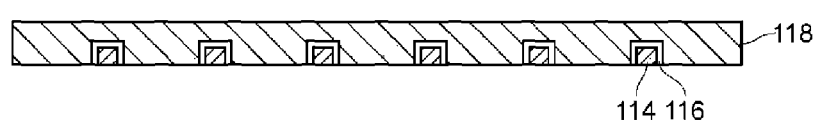
Figure 5:
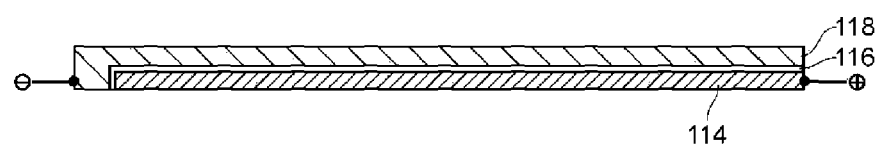

FIG. 5 illustrates the construction of a collector 110a used in a method for manufacturing a separator, according to a second embodiment of the present invention. FIG. 5a is a bottom view of the collector 110a, FIG. 5b is a sectional view taken along line A1-A1 of FIG. 5a, and FIG. 5c is a sectional view taken along line A2-A2 of FIG. 5a.

The separator manufacturing method according to the second embodiment includes the same processes as those of the separator manufacturing method according to the first embodiment, but the construction of the collector used in the first process of the second embodiment is different from that of the first embodiment. The collector 110a used in the separator manufacturing method according to the second embodiment is configured such that a collector electrode 114 is embedded in an electrode body 118, which is equipotential with the nozzle 122, with an insulator 116 provided between the collector electrode 114 and the electrode body 118.

As such, in the separator manufacturing method according to the second embodiment, although the construction of the collector used during the first process is different from that of the first embodiment, the first process and the second process are successively conducted in the same manner as that of the separator manufacturing method according to the first embodiment, whereby a separator which has the above-mentioned construction and has high insulation, high dendrite resistance, high ion conductivity and high mechanical strength can be manufactured in the same manner as that of the first embodiment.

Furthermore, in accordance with the separator manufacturing method according to the second embodiment, the openings O of the separator have more reliably opened structures, compared to that of the separator manufactured by the separator manufacturing method according to the first embodiment.

The separator manufacturing method according to the second embodiment has the same processes as those of the separator manufacturing method according to the first embodiment, other than the fact that the construction of the collector used during the first process differs between the first and second embodiments. Therefore, the separator manufacturing method according to the second embodiment can have effects corresponding to the effects of the separator manufacturing method according to the first embodiment.

Embodiment 3

Figure 6:
FIG. 6 illustrates a method for manufacturing a separator, according to a third embodiment of the present invention.
Figure 6:
Figure 6:
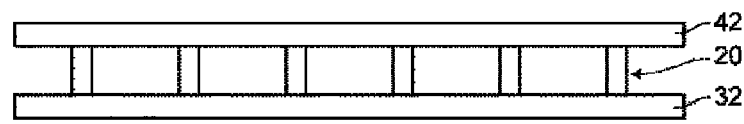

FIG. 6 illustrates a method for manufacturing a separator according to a third embodiment of the present invention. FIGS. 6a through 6c are sectional views showing processes of manufacturing the separator.

The separator manufacturing method according to the third embodiment basically includes the same processes as those of the separator manufacturing method according to the first embodiment, but the contents of the second process of the third embodiment are different from that of the first embodiment. In detail, as shown in FIG. 6, in the separator manufacturing method according to the third embodiment, before the second process is carried out, a second nanofiber layer and a third nanofiber layer which are formed by electrospinning are prepared to be respectively used as the second nanofiber layer 32 and the third nanofiber layer 42. During the second process, the second nanofiber layer 32 is attached to one surface of the first nanofiber layer 20, and the third nanofiber layer 42 is attached to the other surface of the first nanofiber layer 20. In this way, the separator 12 according to the third embodiment is manufactured. Adhesive may be used to embody the second process, pressure may be used, or heat and pressure may be used.

As such, although the contents of the second process of the separator manufacturing method according to the third embodiment differ from those of the separator manufacturing method according to the first embodiment, the first process and the second process are successively conducted in the same manner as that of the separator manufacturing method according to the first embodiment, whereby a separator which has the above-mentioned construction and has high insulation, high dendrite resistance, high ion conductivity and high mechanical strength can be manufactured.

Furthermore, the separator manufacturing method according to the third embodiment is able to increase productivity in a separator production.

In addition, the separator manufacturing method according to the third embodiment has the same processes as those of the separator manufacturing method according to the first embodiment, other than the fact that the contents of the second process differ between the first and second embodiments. Therefore, the separator manufacturing method according to the third embodiment can have effects corresponding to the effects of the separator manufacturing method according to the first embodiment.

Although the preferred embodiments of the present invention have been disclosed for illustrative purposes, the present invention is not limited to the embodiments. Those skilled in the art will appreciate that various modifications are possible, without departing from the scope and spirit of the invention. For instance, the following modifications are also possible.

(1) The number, the location relationship and the size of each element of each embodiment are to be proposed only for illustrative purposes, and the present invention is not limited to these.

Figure 7:
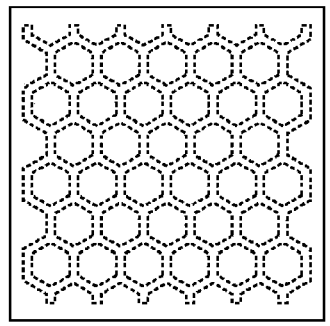
FIG. 7 illustrates separators (14), (16) and (18), according to a modification of the present invention.
Figure 7:
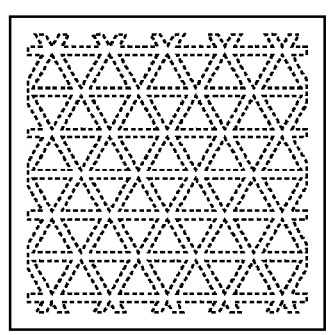
Figure 7:
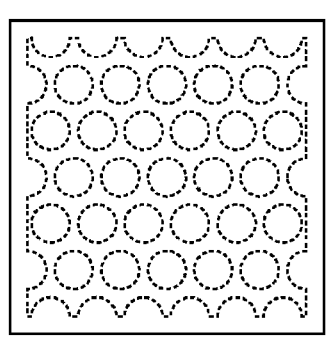

(2) In each embodiment, although the separator that includes the first nanofiber layer which has square openings and has a crisscross lattice structure has been illustrated as being one example of the separator of the present invention, the present invention is not limited to this. FIG. 7 illustrates separators 14, 16 and 18 according to modifications of the present invention. Referring to FIG. 7, the first nanofiber layer may have, as shown in FIG. 7a, a lattice structure having hexagonal openings, or it may have, as shown in FIG. 7b, a lattice structure having triangular openings, or it may have a lattice structure having circular openings, as shown in FIG. 7c. In addition, the first nanofiber layer may have other lattice structures. In other words, in the present invention, the term 「 lattice structure 」 can include all kinds of lattice structures, so long as it has openings having any shape and a partition (lattice) defining the openings.

In each embodiment, although the upward discharge type electrospinning apparatus having the upward nozzle has been illustrated as being used in the separator manufacturing method of the present invention, the present invention is not limited to this structure. For example, a downward discharge type electrospinning apparatus having a downward nozzle or a horizontal discharge type electrospinning apparatus having a horizontal nozzle may be used in the separator manufacturing method of the present invention.

The invention claimed is:
1. A separator, comprising:
a first nanofiber layer having a lattice shape when viewed from a plan view;
a second nanofiber layer provided on a first surface of the first nanofiber layer, the second nanofiber layer being thinner than the first nanofiber layer; and
a third nanofiber layer provided on a second surface of the first nanofiber layer, the third nanofiber layer being thinner than the first nanofiber layer wherein the first nanofi- ber layer has a plurality of openings having a total area greater than a total area of a lattice when viewed from the plan view.

2. The separator according to claim 1, wherein the first nanofiber layer has a thickness ranging from 7 μm to 30 μm.

3. The separator according to claim 1, wherein each of the second nanofiber layer and the third nanofiber layer has a thickness ranging from 1 μm to 5 μm.

4. The separator according to claim 1, wherein each of the openings has an average area ranging from 10 μm² to 200 μm² when viewed from the plan view.

5. A method for manufacturing a separator, comprising:
a first process of applying a voltage between a nozzle and a collector electrode, having a lattice shape when viewed from a plan view, the collector electrode being disposed on an insulating support, and discharging polymer solution from the nozzle, thus forming a first nanofiber layer, having a lattice shape when viewed from a plan view, on the collector electrode; and
a second process of forming a second nanofiber layer on a first surface of the first nanofiber layer, the second nanofiber layer being thinner than the first nanofiber layer, and forming a third nanofiber layer on a second surface of the first nanofiber layer, the third nanofiber layer being thinner than the first nanofiber layer.

6. The method for manufacturing the separator according to claim 5, wherein in the first process, the forming of the first nanofiber layer comprises forming a first nanofiber layer having a thickness ranging from 7 μm to 30 μm.

7. The method for manufacturing the separator according to claim 5, wherein in the second process, the forming of the second nanofiber layer and the third nanofiber layer comprises forming a second nanofiber layer and a third nanofiber layer, each of which has a thickness ranging from 1 μm to 5 μm.

8. The method for manufacturing the separator according to claim 5, wherein in the first process, the forming of the first nanofiber layer comprises forming a first nanofiber layer having a plurality of openings having a total area greater than a total area of a lattice when viewed from the plan view.

9. The method for manufacturing the separator according to claim 8, wherein each of the openings has an average area ranging from 10 μm² to 200 μm² when viewed from the plan view.

10. The method for manufacturing the separator according to claim 5, wherein in the second process, the second nanofiber layer is formed on the first surface of the first nanofiber layer by electrospinning, and the third nanofiber layer is formed on the second surface of the first nanofiber layer by electrospinning.

11. The method for manufacturing the separator according to claim 5, wherein before the second process is conducted, a second nanofiber layer and a third nanofiber layer that are formed by electrospinning are prepared to be respectively used as the second nanofiber layer and the third nanofiber layer, and during the second process, the second nanofiber layer is attached to the first surface of the first nanofiber layer, and the third nanofiber layer is attached to the second surface of the first nanofiber layer.

12. A separator, comprising:
a first nanofiber layer configured to have a lattice structure when viewed from a plan view wherein the first nanofiber layer has a thickness ranging from 7 μm to 30 μm;
a second nanofiber layer formed on an upper surface of the first nanofiber layer, the second nanofiber layer configured for being thinner than the first nanofiber layer; and
a third nanofiber layer formed on a lower surface of the first nanofiber layer, the third nanofiber layer configured for being thinner than the first nanofiber layer wherein each of the second nanofiber layer and the third nanofiber layer has a thickness ranging from 1 μm to 5 μm; and
wherein the first nanofiber layer has a plurality of opened structures defined by the lattice structure when viewed from the plan and side views.

* * * * *